(12) United States Patent
Déjean (10) Patent No.: US 8,478,046 B2
(45) Date of Patent: Jul. 2, 2013

(54) SIGNATURE MARK DETECTION

(75) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 61 days.

(21) Appl. No.: 13/288,109

(22) Filed: Nov. 3, 2011

(65) Prior Publication Data

US 2013/0114914 A1 May 9, 2013

(51) Int. Cl.
*G06K 9/00* (2006.01)
*G06K 9/34* (2006.01)

(52) U.S. Cl.
USPC .......................................... 382/181; 382/173

(58) Field of Classification Search
USPC .................. 382/100, 173–180; 715/234, 241, 715/251
See application file for complete search history.

(56) References Cited

U.S. PATENT DOCUMENTS

| | | | |
|---|---|---|---|
| 7,333,246 B1* | 2/2008 | Kowalski et al. | 358/452 |
| 7,340,112 B2* | 3/2008 | Jiang | 382/306 |
| 7,392,473 B2 | 6/2008 | Meunier et al. | |
| 7,529,408 B2* | 5/2009 | Vohariwatt et al. | 382/180 |
| 7,693,848 B2 | 4/2010 | Dejean et al. | |
| 7,730,085 B2 | 6/2010 | Hassan et al. | |
| 7,739,587 B2 | 6/2010 | Vion-Dury | |
| 7,852,499 B2 | 12/2010 | Dejean | |
| 7,937,653 B2 | 5/2011 | Dejean et al. | |
| 2006/0155703 A1 | 7/2006 | Dejean et al. | |
| 2006/0277173 A1 | 12/2006 | Li et al. | |
| 2007/0196015 A1 | 8/2007 | Meunier et al. | |
| 2008/0114757 A1 | 5/2008 | Dejean et al. | |
| 2009/0192956 A1 | 7/2009 | Dejean et al. | |
| 2010/0107045 A1 | 4/2010 | Filippova et al. | |
| 2010/0145902 A1 | 6/2010 | Boyan et al. | |
| 2010/0293159 A1 | 11/2010 | Zhang et al. | |
| 2010/0306260 A1 | 12/2010 | Dejean et al. | |
| 2011/0145701 A1 | 6/2011 | Dejean et al. | |
| 2011/0225490 A1 | 9/2011 | Meunier et al. | |
| 2012/0020513 A1* | 1/2012 | Outram | 382/100 |

OTHER PUBLICATIONS

Bauman, et al. "TEI and the Encoding of the Physical Structure of Books", Text Encoding Initiative 10$^{th}$ Anniversary User Conference, Retrieved Sep. 27, 2011, http://www.stg.brown.edu/conferences/tei10.papers/bauman_catapano.html , pp. 1-6.
Ramel, et al. "User-driven page layout analysis of historical printed books", 2007, International Journal on document analysis and recognition, vol. 9, No. 2-4, pp. 243-261.
U.S. Appl. No. 12/773,125, filed May 4, 2010, Dejean.
U.S. Appl. No. 12/853,461, filed Aug. 10, 2010, Dejean et al.
U.S. Appl. No. 12/892,138, filed Sep. 28, 2010, Dejean.
U.S. Appl. No. 12/973,843, filed Dec. 21, 2010, Dejean.

* cited by examiner

*Primary Examiner* — Li Liu
(74) *Attorney, Agent, or Firm* — Fay Sharpe LLP (57) ABSTRACT

A system and method for detection of signature marks in documents are provided. The method includes selecting candidate text objects in document pages and identifying a sequence of elements therein. The sequence has a numbering pattern including an incremental part and optionally a fixed part. Missing elements between two detected elements of the sequence are permitted. For an identified sequence, a model of the sequence is generated, which includes the numbering pattern of the sequence, an increment, which is computed based on the distance between pages on which consecutive elements of the sequence are identified, a valid sequence having an increment of greater than 1, and a first page, which corresponds to a page of the document on which the sequence starts. The sequence is then validated with the model, allowing elements of the sequence in the pages of the document to be identified as signature marks.

22 Claims, 8 Drawing Sheets

SIGNATURE MARK DETECTION

BACKGROUND

The exemplary embodiment relates to the processing of documents that were once in hardcopy form into a structured format in order to provide access to content within the documents. It finds particular application in connection with the detection of signature marks in documents.

There is a considerable interest in the conversion of hardcopy documents, such as books, manuals, and proprietary reference documents, into digital form so that they can be more widely accessible to the public, or to facilitate storage of the documents, reusing or repurposing parts of the documents, or providing document uniformity across a database of stored information. Converting an unstructured document to a structured document such as XML entails obtaining meaningful structural information about the unstructured document for use in the structuring. This can be done manually. However, to facilitate automated or semi-automated document conversion, it is advantageous to identify structural features in a document automatically. Generally, hardcopy documents are scanned to provide a set of digital pages. Optical Charter Recognition (OCR) processing of the scanned pages allows text and graphical elements of the page to be identified and labeled accordingly. Then, page numbers, titles, and so forth may be appropriately labeled with a markup language such as extensible markup language (XML), standard generalized markup language (SGML), or hypertext markup language (HTML), among others.

One problem with such automated methods is that signature marks can interrupt the flow of the converted document. In the printing domain, signature marks are small textual elements related to imposition, a step which aims at arranging printed pages. On each side of a single sheet (called a forme), several pages are printed, such as from 2 to 32, or more. The way the pages are arranged depends on the folding schema, which specifies how to fold and section the sheet to provide the leaves of the finished book. A folded sheet is called a gathering or a signature. For example, eight pages may be laid down on one side of a single sheet and eight on the other. Due to the intended folding, the pages are not in the same order as they would be in the finished book. For example, page 1 of the set may be positioned next to the pages 8 and 16. A book made of sheets folded once, to form two leaves (or 4 pages), is called a folio; when folded twice (8 pages), it is called quarto; when folded three times (8 leaves, 16 pages), an octavo, etc. up to 64 folds.

A book is composed of several gatherings. Once folding is done, all the gatherings, which make the book, are ordered and then bound together. In order to avoid errors in this conventionally manual stage, signature marks are left by the printer on some pages of the gathering to indicate the proper sequence in which to bind the printed sheets. This may be the first page in simple folding schema, although some gatherings may have two (or more) signature marks. In general, however, they are found on only a minor proportion of the pages. Signatures commonly run from A-Z, omitting the letters J and U, with letters repeated if the alphabet runs out, e.g., AA-ZZ, AAA-ZZZ, etc. Gatherings are named by the signature mark assigned to them, and leaves can be named by their place within a gathering. Signature marks often have a regularity in their occurrence, but this varies from book to book. For example, signature marks could occur every 2, 8, 16, 25, or 32 pages, depending on the sheet size and its folding. Additionally, the first signature mark often does not occur on the first few pages of a book. Accordingly, given a set of scanned pages of a book, it is very difficult to predict, on which pages the signature marks will occur.

As signature marks are small pieces of text that are somewhat isolated from the rest of the text, typically occurring in the bottom margin, OCR engines have difficulties in correctly recognizing them. Since they often correspond to single letters or numbers, this does not provide enough context to the OCR engines. They can be simply ignored (missed during the zoning step which spots textual zones in a page), or badly recognized. While annotations could be added manually to identify the signature marks in the digital document, this is time consuming and also prone to errors.

The exemplary embodiment provides an automated system and method for detecting signature marks in such documents.

INCORPORATION BY REFERENCE

The following references, the disclosures of which are incorporated herein in their entireties by reference, are mentioned.

The following relate generally to the detection of reference to page numbers and numerical sequences in page description language documents:

U.S. Pub. No. 20110225490, published Sep. 15, 2011, entitled DOCUMENT ORGANIZING BASED ON PAGE NUMBERS, by Jean-Luc Meunier, discloses a digital processing device for identifying logical page numbers of a document; U.S. Pub. No. 20110145701, published Jun. 16, 2011, entitled METHOD AND APPARATUS FOR DETECTING PAGINATION CONSTRUCTS INCLUDING A HEADER AND A FOOTER IN LEGACY DOCUMENTS by Hervé Déjean, et al.; U.S. Pub. No. 20100306260, published Dec. 2, 2010, entitled NUMBER SEQUENCES DETECTION SYSTEMS AND METHODS, by Hervé Déjean, et al.; U.S. Pub. No. 20100107045, published Apr. 29, 2010, entitled METHODS AND APPARATUSES FOR INTRA-DOCUMENT REFERENCE IDENTIFICATION AND RESOLUTION, by Katja Filippova, et al.; U.S. Pub. No. 20090192956, published Jul. 30, 2009 (U.S. Pat. No. 7,991,709) entitled METHOD AND APPARATUS FOR STRUCTURING DOCUMENTS UTILIZING RECOGNITION OF AN ORDERED SEQUENCE OF IDENTIFIERS, by Hervé Déjean, et al.; and U.S. Pub. No. 20080114757, published May 15, 2008, entitled VERSATILE PAGE NUMBER DETECTOR, by Hervé Déjean, et al.; AND U.S. application Ser. No. 12/853,461, filed Aug. 10, 2010, entitled OPTICAL CHARACTER RECOGNITION WITH TWO-PASS ZONING, by Hervé Déjean and Jean-Luc Meunier.

The following references relate generally to the creation of structured documents: U.S. Pub. No. 20110225490, published Sep. 15, 2011, entitled DOCUMENT ORGANIZING BASED ON PAGE NUMBERS, by Jean-Luc Meunier, et al.; U.S. application Ser. No. 12/773,125, filed May 4, 2010, entitled SYSTEM AND METHOD FOR UNSUPERVISED GENERATION OF PAGE TEMPLATES, by Hervé Déjean; U.S. application Ser. No. 12/892,138, filed Sep. 28, 2010, entitled SYSTEM AND METHOD FOR PAGE FRAME DETECTION, by Hervé Déjean; U.S. application Ser. No. 12/974,843, filed on Dec. 21, 2010, entitled SYSTEM AND METHOD FOR LOGICAL STRUCTURING OF DOCUMENTS BASED ON TRAILING AND LEADING PAGES, by Hervé Déjean; U.S. Pub. No. 20060155703, published Jul. 13, 2006, entitled METHOD AND APPARATUS FOR DETECTING A TABLE OF CONTENTS AND REFERENCE DETERMINATION, by Hervé Déjean, et al.; U.S. Pat. No. 7,392,473, issued Jun. 24, 2008, entitled METHOD AND APPARATUS FOR DETERMINING LOGICAL DOCU- MENT STRUCTURE, by Jean-Luc Meunier; U.S. Pat. No. 7,693,848, issued Apr. 6, 2010, entitled METHOD AND APPARATUS FOR STRUCTURING DOCUMENTS BASED ON LAYOUT, CONTENT AND COLLECTION, by Hervé Déjean, et al.; U.S. Pat. No. 7,739,587, issued Jun. 15, 2010, ENTITLED METHODS AND APPARATUSES FOR FINDING RECTANGLES AND APPLICATION TO SEGMENTATION OF GRID-SHAPED TABLES, by Jean-Yves Vion-Dury; U.S. Pat. No. 7,852,499, issued Dec. 14, 2010, entitled CAPTIONS DETECTOR, by Hervé Déjean; and U.S. Pat. No. 7,937,653, issued May 3, 2011, entitled METHOD AND APPARATUS FOR DETECTING PAGINATION CONSTRUCTS INCLUDING A HEADER AND A FOOTER IN LEGACY DOCUMENTS, by Hervé Déjean, et al.

BRIEF DESCRIPTION

In accordance with one aspect of the exemplary embodiment, a method for detection of signature marks in a document includes selecting candidate text objects for each of an ordered set of optical character recognition (OCR) processed document pages and identifying a sequence of elements in the candidate text objects. Each detected element of the sequence occurring on a different page of the document. The sequence has a numbering pattern including an incremental part and optionally a fixed part. Missing elements between two detected elements of the sequence are permitted. For an identified sequence, a model of the sequence is generated, which includes the numbering pattern of the sequence, an increment, which is computed based on the distance between pages on which consecutive elements of the sequence are identified, a valid sequence having an increment of greater than 1, and a first page, which corresponds to a page of the document on which the sequence starts. The method further includes validating the sequence with the model, and for a valid sequence, identifying elements of the sequence in the pages of the document as signature marks.

In another aspect, a system for detection of signature marks in a document, includes a candidate selector configured for selecting candidate text objects in an ordered set of document pages, a sequence detector configured for identifying sequences of elements detected in the candidate text objects, each detected element of the sequence occurring on a different page of the document, the sequence having a numbering pattern including an incremental part and optionally a fixed part, the sequence identification allowing for missing elements between two detected elements of the sequence. A model generator is configured for generating models of the sequences identified by the sequence detector, each model storing the numbering pattern of the respective sequence, an increment, which is computed based on the distance between pages on which consecutive detected elements of the sequence are identified, a valid sequence having an increment of greater than 1, and a first page, which corresponds to the page of the document on which the sequence starts, the model generator combining sequences for which the respective models are equivalent. A sequence validator is configured for validating the sequences with the model, including at least one of deleting elements which do not comply with the model, and searching for additional elements of the sequence not yet identified by considering only the content of pages which comply with the model.

In another aspect, a method for detection of signature marks in a document includes receiving an ordered set of document pages into computer memory, the pages having been generated by scanning a multi-page hardcopy document and providing for identifying sequences of elements in the pages, each sequence having a numbering pattern. Each detected element of a respective sequence, apart from the first, having an incremental part which is at least one higher than the incremental part of the previous element of the sequence detected on a previous page of the document, each detected element of the sequence using the same character set, and wherein up to a maximum number of missing elements between two detected elements of the sequence are permitted. The method further includes providing for generating a respective model of the sequences identified, each model including the numbering pattern of the sequence, an increment, and a first page. The increment is computed, based on the distance between the page on which the element is identified and the page on which the next element of the sequence is identified, for a plurality of the elements of the sequence, a valid sequence having an increment of greater than 1. The first page, which corresponds to the page of the document on which the sequence starts, is computed using the increment and page numbers for a plurality of the elements of the sequence. The sequence is validated with the model and, for a valid sequence, elements of the sequence in are identified in the pages of the document as signature marks.

DETAILED DESCRIPTION

Aspects of the exemplary embodiment relate to a computer implemented system and a method for automatic detection and optionally extraction of text elements corresponding to signature marks in pages of a digital document derived from a hardcopy document, such as a book. The digital documents may be page description language documents, such as PDF, PostScript, PCL-5, PCL-5E, PCL-6, PCL-XL or other suitable document or may have been already converted to a partially structured document, such as XML, SGML, or HTML, among others. The exemplary method finds application in rebuilding the reading order of the page content since signature marks often break the content flow.

The system and method find application in libraries involved in digital heritage programs. While signature marks are no longer used, since imposition is now performed automatically, there are still many books in circulation that were printed before the 1950's which can have signature marks.

Figure 1:
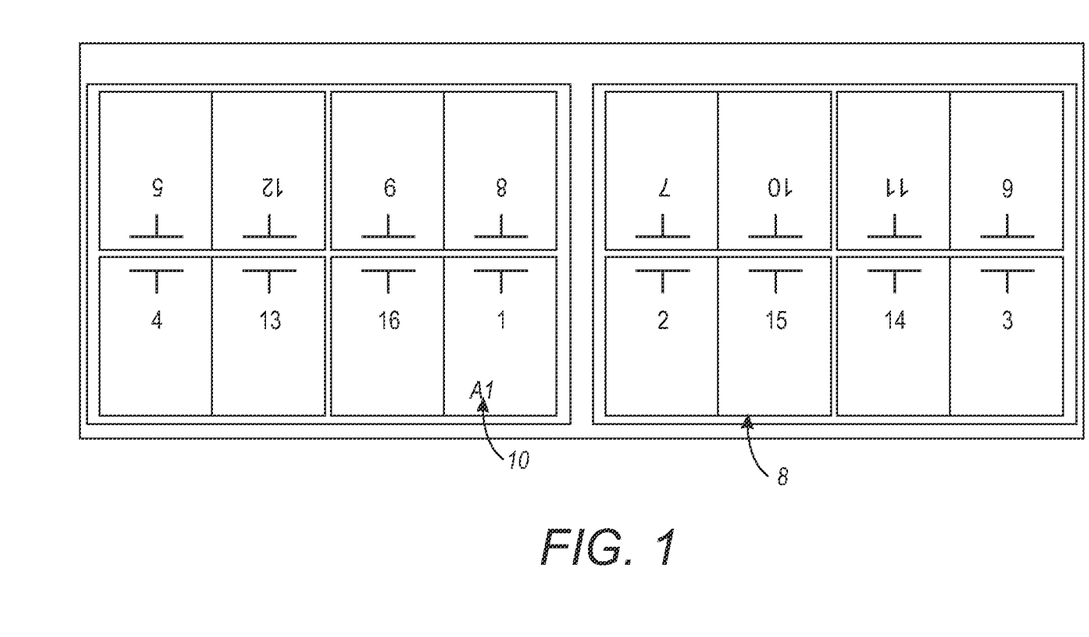
FIG. 1 is a schematic view of a hardcopy sheet with a signature mark.

The signature marks to be detected by the system are textual marks used to ensure that pages of a hardcopy document are arranged in the appropriate order during the imposition step in printing. These signature marks indicate the order that the gatherings have to respect. They correspond formally to ordered sequences of numbered patterns. FIG. 1 illustrates an exemplary forme 8 including of a signature mark 10 and the number order of the pages when a gathering is generated.

Figure 2:
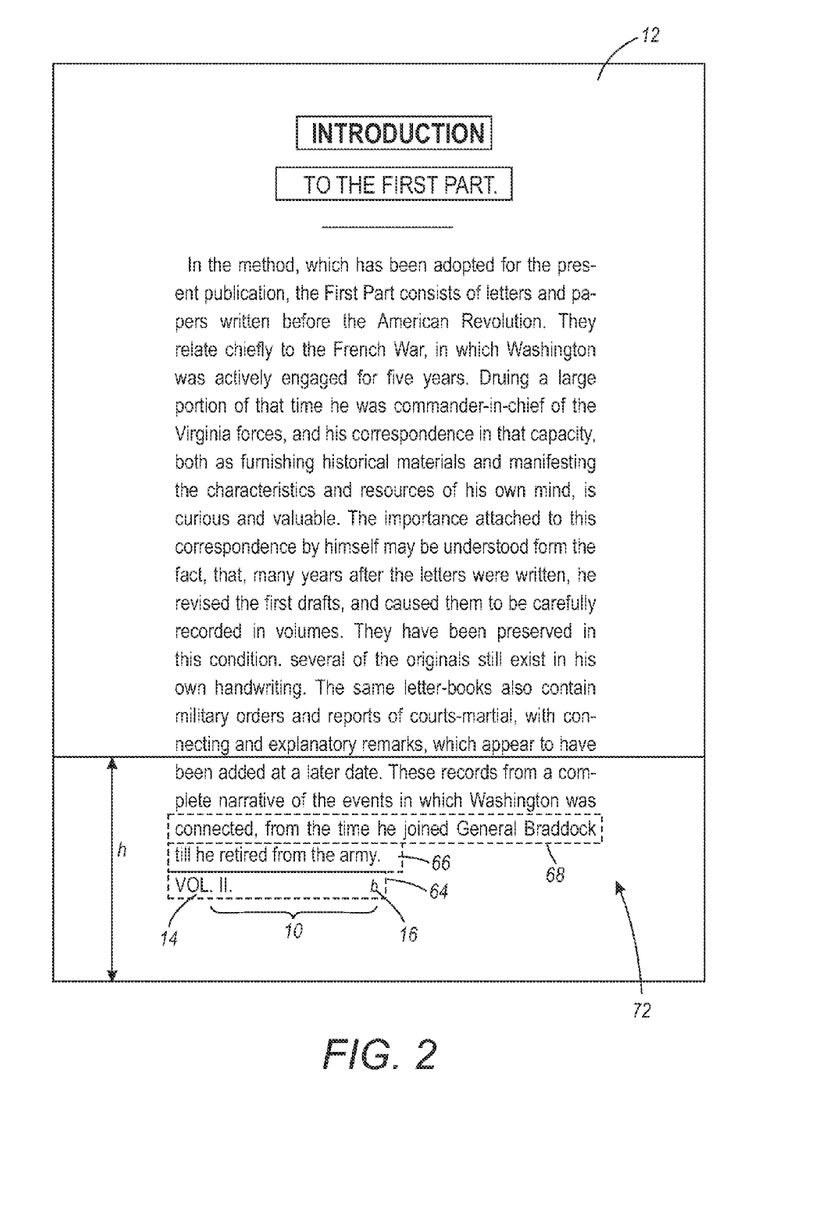
FIG. 2 illustrates a scanned page of a book with a signature mark.

With reference to FIG. 2, which shows a scanned page 12 of a digital document, such as book, each signature mark 10 is a textual element obeying a numbering pattern, which can have a fixed (static) part 14 and an incremental part 16. The fixed part ("VOL. II." in the illustrated page), is optional (i.e., can be empty) and can be positioned to the left or right of the incremental part, or both. The incremental part 16 obeys a logical numbering sequence, generally incrementing by a single number (digit or letter) on each occurrence in the document. The pattern used to generate the sequence of text elements can be an alphanumeric character, such as a single letter or number, which may be in Arabic or Roman numerals (upper or lower case), or a combination of these. As the fixed part, the volume number of the book can be provided, for a multi-volume work. As examples, a signature mark sequence may be of the form:

A1, A2, A3, ...;
i, ii, iii, iv, ...;
1a, 1b, 1c, ...;
Vol. II. b, Vol. II. c, Vol. II. d; or the like.

In general, a signature mark occurs on fewer than all, such as a minority (less than half) of the pages in a book, such as approximately every 8, 16, 32, or 64 pages, which may correspond to the number of pages in a gathering, although other intervals are not uncommon. It is thus not as frequent as a page number, which generally occurs on consecutive pages, or at least on the left or right hand page, throughout most of a book, and which increments by 1 for each consecutive page in a set of pages. The signature mark may occur throughout the book, although it may be missing from beginning and ending pages. Additionally, due to a high level of noise (the signature marks generally correspond to small pieces of text in the bottom margin), they are often ignored or badly recognized by OCR engines. Thus, signature marks may be present in the scanned document pages which have not been correctly recognized by OCR processor 36.

To deal with this high level of noise and infrequent occurrence, the exemplary system and method automatically builds a model of this document object (signature mark) from partial recognized sequences of text elements that are likely to be signature marks. The model is then applied to the document in order to detect noisy or missing elements in the sequence and thereby correct the sequence.

Figure 3:
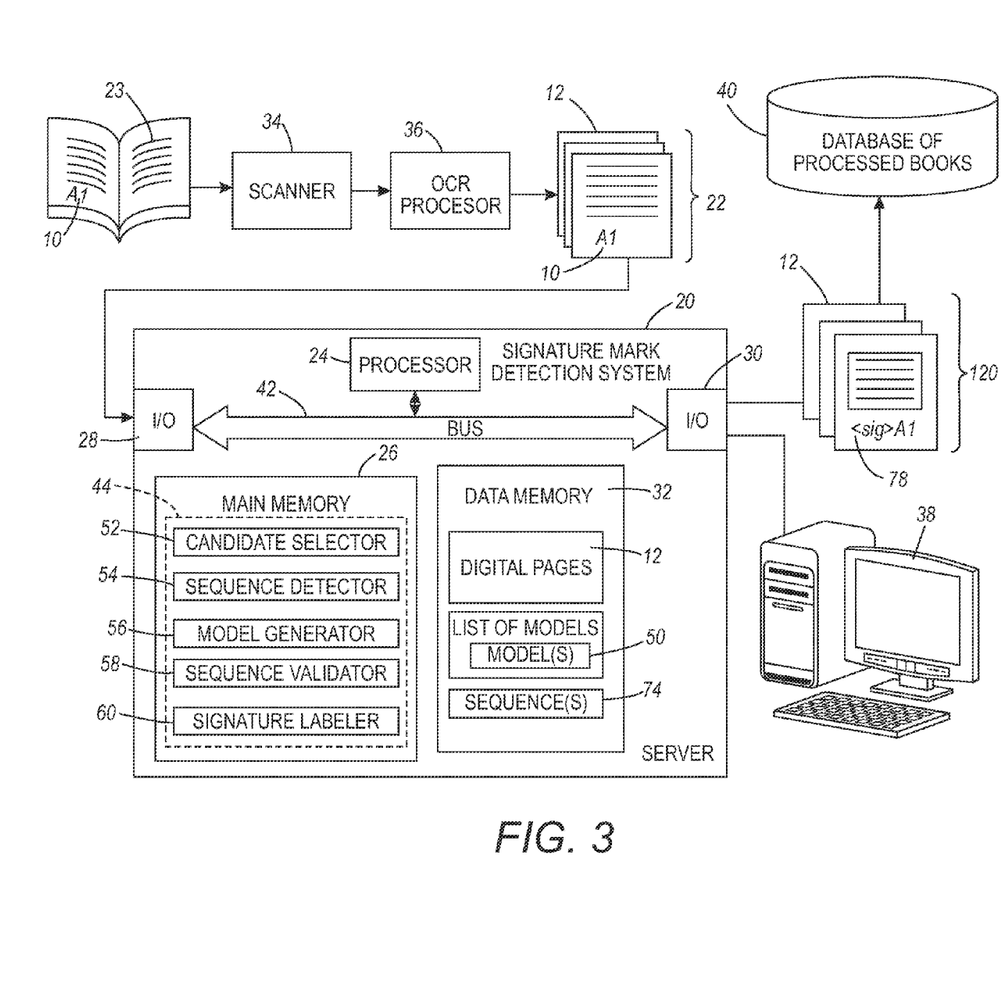
FIG. 3 illustrates a system for detection of signature marks in accordance with one aspect of the exemplary embodiment.

FIG. 3 illustrates an environment in which an exemplary signature mark detection system 20 operates. The computer-implemented system 20 is capable of detecting signature marks 10 in pages 12 of a digital document 22 and labeling them and/or removing them from the digital document. The illustrated computer system 20 includes a processor 24, which controls the overall operation of the computer system 20 by execution of processing instructions which are stored in memory 26 communicatively connected to the processor 22. Computer system 20 also includes one or more input/output interface(s) 28, 30 for receiving a digital document into volatile data memory 32 and for outputting the digital document once the signature marks have been detected and labeled/removed. Digital document 22 includes a set of scanned pages 12. The pages 12 are ordered as in the original hardcopy document 23, such as a book, from which they are generated. The exemplary interface 28 receives digital document 22 from an input device, such as a scanning device 34, and an optical character recognition (OCR) processor 36 that are communicatively linked to the interface. In other embodiments, the OCR processor 36 may be a part of the system 20, and/or the system 20 may be integrated into the scanning device 34. Interface 30 may be connected with one or more output devices, such as a display screen 38 and/or a memory storage device 40. The various components of the computer system 20 may all be communicatively linked by a data/control bus 42. The processor 24 executes instructions 44 stored in memory 26 for performing the method outlined in FIG. 4. Memory 32, which can be the same as or separate from memory 26, stores the OCR-processed (OCRed) digital document pages 12 during processing. Each stored page is accorded a page number, which is based on the order in which the pages were scanned. The first page is given the number 1, the second page 2, and so forth. As will be appreciated, therefore, the page numbers used by the system, and as described in the exemplary method, may not correspond to the page numbers printed on the pages of the book.

The optical character recognition (OCR) processor 36 performs optical character recognition (OCR) on the scanned image copy of the document to generate document text, and segments the OCRed document text into text objects, such as lines of text as they appeared on the original hardcopy or equivalently as they appeared in the image copy of the document, or grammatical sentences suitably identified by pairing capitalized words with end punctuation such as a period, question mark, or exclamation point, or paragraphs, or so forth. The optical character recognition (OCR) processor 36 optionally performs other operations such as employing spell-checking on the OCRed document text to correct for OCR errors, or provides "mark-up" indicative of font characteristics, underscores, or other text presentation features, detects image content of the document 23 and stores the image content in a separate file or files that are linked with the unstructured document 22, or embeds the images in the document pages 12. In some cases, a human user is optionally allowed to review the OCRed text and manually correct OCR errors, however, this is generally not practical for large scale scanning of books, and can lead to additional errors.

The computer system 20 may be include one or more specific or general purpose computers, such as a PC, such as a desktop, a laptop, palmtop computer, or portable digital assistant (PDA), a server computer, cellular telephone, tablet computer, combination thereof, or other computing device capable of executing instructions for performing the exemplary method.

The memory 26, 32 may represent any type of non-transitory computer readable medium such as random access memory (RAM), read only memory (ROM), magnetic disk or tape, optical disk, flash memory, or holographic memory. In one embodiment, the memory 26, 32 comprises a combination of random access memory and read only memory. In some embodiments, the processor 24 and memory 26 may be combined in a single chip. The network interface(s) 28, 30 allow the computer to communicate with other devices via a wired or wireless link e.g., a computer network, such as a local area network (LAN) or wide area network (WAN), or the internet, and may comprise a modulator/demodulator (MODEM). The digital processor 24 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 3 is a high level functional block diagram of only a portion of the components which are incorporated into a computer system 20. Since the configuration and operation of programmable computers are well known, they will not be described further.

To address the problem of noise in the OCR output 12, the exemplary system 20 generates candidate signature sequences. Then, using these partial sequences, models 50 are generated and used to identify complete sequences, as well as to detect wrong and missing elements.

As described in further detail below, the system 20 includes a candidate selector 52, a sequence detector 54, a model generator 56, a sequence validator 58, and a signature labeler 60. Briefly, the candidate selector 52 selects candidate text objects 64, 68, 70 (FIG. 2) on each page in an area 72 where a signature mark, if present, may be expected to be found. Each of the text objects 64, 68, 70 includes one or more text elements. The sequence detector 54 detects candidate signature mark sequences 74 of text elements from within the selected text objects 64, 68, 70. The model generator 76 generates one or more models 50, based on the detected candidate sequences 74. The sequence validator 58 validates, e.g., corrects, the candidate sequences 74, based on the model(s) 50. The signature labeler 60 processes (e.g., labels) text elements of the sequences corresponding to signature marks so they can be identified and/or extracted from the document pages. For example, the text elements that are determined to be signature marks 10 are labeled with labels 78, such as XML or html labels.

The Model

It is assumed that a valid signature mark sequence 74 is composed of the following elements:
1. A numbering pattern, such as a letter or number pattern, the text elements forming the signature mark sequence obeying the pattern,
2. A first page, which corresponds to the first page of the book on which a signature mark sequence starts (this value is denoted by fp), and
3. An increment, which is the distance in number of pages between two consecutive signature marks in the sequence (this value is denoted by inc).

The model 50, for a given sequence 74, stores the pattern and values fp and inc of the first page and increment. The list of pages 12 on which signature marks are expected to occur can thus be automatically generated knowing the first page and the increment.

Figure 4:
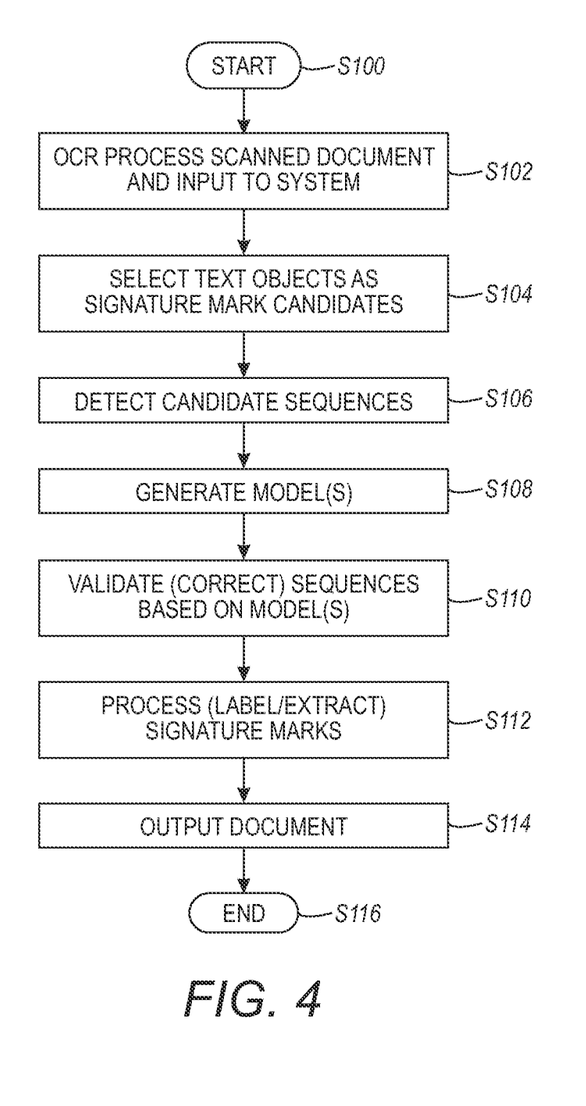
FIG. 4 illustrates a method for signature mark detection in accordance with another aspect of the exemplary embodiment.

FIG. 4 illustrates the exemplary computer-implemented method. The method begins at S100. At S102, a multi-page document 22 to be processed is input to the system and stored in memory 32. If the document has not already been OCR processed, the system 20 may perform OCR processing to identify, for each page, a set of text objects and their locations on the page.

At S104, for each page containing text objects, candidate text objects 64, 66, 68 are selected by the candidate selector 52, based on their location on the page 12 of the document.

At S106, candidate signature mark sequences 74 are detected (by the sequence detector 54) which each comprise a set of text elements occurring in the candidate text objects 64, 66, 68.

At S108, models 50 are generated (by the model generator 56), based on the sequences detected at S106, and stored in memory 32.

At S110, the models 50 are applied (by the sequence validator 58) to validate, e.g., correct, the respective candidate sequences 74 to produce validated sequences. Elements of the sequence not in compliance with the model 50 may be deleted and/or missing elements on pages complying with the model may be identified and added to the sequence in this step.

At S112, signature marks 10 in the digital document corresponding to elements of the sequences are detected and processed (by the signature labeler 60), e.g., labeled and/or extracted.

At S114, the processed document 120 is output, e.g., to memory or to display device 34. As will be appreciated, other processing may be performed on the document, such as extraction of page numbers, headers and footers, tables, and the like, generation of a table of contents, and so forth, prior to the output of the document. Additionally, having detected the signature marks, document content may be extracted without the signature marks interrupting the flow.

The method ends at S116.

Further details of the system and method will now be provided. As an example of the method, two scanned books were processed with the exemplary method, referred to herein as Book A (a 798 page book) and Book B (a 644 page book).

Input (S102)

As input, the method takes the result of an OCR output 22 for a whole book 23. Each book is represented by a set of ordered OCRed pages 12. Each page contains its textual objects (usually, lines of text) and their position in the page (e.g., as defined by a height and width of a rectangular bounding box which just encompasses the text object, and x,y coordinates of a selected corner (e.g., top left) of the bounding box.

2: Candidates Selection (S104)

Signature marks invariably occur in the bottom margin of a page, if at all. Accordingly, only the last n text objects 64, 66, 68 occurring on the bottom of each page are considered, where each text object is generally only one line of text in height. n may be, for example, from 1-5. For example, n=2 or n=3. n=3 is used in the examples herein. Additionally, other constraints may be applied, such as an area constraint: for example, the method only considers text objects located in a lower area 72 of the page (FIG. 2) as candidates, such as in an area of height h, where h may be, for example, half or one third of the total height of the page, or less. In the exemplary method, no candidates are selected if there are no text objects in the bottom third of the page.

3: Sequences Detection (S106)

In order to detect signature mark sequences, the sequence detector 54 looks for text elements that form patterns. This may be performed using the method described in U.S. Pub. No. 20100306260, the disclosure of which is incorporated herein by reference in its entirety. This method allows for detecting numbered sequences, whatever the distance (number of pages) between elements of the sequence. The method is also able to infer automatically the numbering pattern used. Since signature marks are often impacted by noise (zoning or OCR error), many of them are not properly recognized during the OCR step. The detection of the numbered sequences therefore allows for missing (non-contiguous) elements in a candidate signature mark sequence.

The detection of sequences aims to identify text elements (or simply "elements") of some of the selected text objects that have an incremental relation to each other. That is, a portion of some text objects which varies in an incremental way. A valid candidate signature mark sequence 74 respects:

1. Incrementality—each element of the candidate sequence 74 is at least one higher than the previous one detected on a previous page of the document (except for the first element of the sequence).

2. Each detected element of the candidate sequence 74 uses the same character set, such as letters, Arabic numerals, Roman numerals, or a combination thereof. Case may also be taken into account for letters and Roman numerals. The system may store a set of these numbering sequences.

To allow for OCR errors, the exemplary sequence detector 54 accepts up to a predetermined maximum number m of missing elements between two recognized elements in a sequence. m can be, for example, from 2-10, e.g., m=5. If more than m contiguous elements are missed for the same candidate signature sequence, two (or more) candidate signature sequences are generated.

Other constraints on the identification of a sequence may also be applied. For example, a valid signature sequence may be required to be composed of at least p elements, where p can be, for example, from 3-6 (e.g., 4). In some embodiments, this constraint may be relaxed until sequences are potentially merged in S108. For example a candidate sequence of p=3 elements may be stored and processed, then discarded later if it is not possible to merge it with another sequence to achieve the threshold length of 4, for example.

The sequence detector 54 also detects any static part of the elements of a sequence. Any characters positioned before and/or after the incremental text element (in the selected text objects) and which are fixed for each element of the sequence are stored as the static part of the pattern.

Examples of valid candidate sequences under the constraint that p=4 thus could include any of the following:

2, 3, 5, 6, 9;
i, iv, v, vi;
4b, 4d, 4e, 4g; and
VOL. I b, VOL. I e, VOL. I f, VOL. I g;
but may exclude each of the following:
2, 3, 5, 6, 9, 19, 21;
i, ii, iii;
4b, 4d, 4e, 7g; and
VOL. IX b, VOL. IX e, vol. ix f, vol. ix g At this stage in the method, the distance (in pages) between elements of a candidate sequence 74 is not considered, except in that no two elements of the same sequence 74 can be present on the same page.

The processing performed by the illustrative sequence detector 54 may include the following: (1) declaration of specific incremental lists, such as for Roman numerals, upper and lower case letters; (2) identification of a pattern in one or more text elements; (3) storage of text elements of candidate text objects which satisfy the pattern and the incrementally test (i) the position and type of the increment is found as well as the fixed part, and (ii) a regular expression representing the pattern is generated having a fixed part (which may be an empty string) and an incremental part.

As an example, looking at the text objects 64, 66, 68 captured on the page shown in FIG. 2, the sequence detector 54 takes portions of the content of these text objects as candidate sequence elements and looks for portions of the text objects on subsequent pages with the same pattern. Many candidate sequences may be created initially, so the same page may include elements of several sequences. After testing each of the possible patterns to find the longest string which matches each pattern, a sequence which includes "VOL. II." as the static part and "b" as the incremental part of the pattern emerges for this book. Other sequences involving this page may also survive, to be discarded at a later stage of the method. In some cases, a pattern can be found which covers two or more text objects on the page. For example, if "VOL. II." and "b" are detected by the OCR as separate text objects on the page, they can still be merged into the same pattern.

Tables 1 and 2 show the list of sequences found at this stage for the example books. Long sequences corresponding to page number sequences are not shown for the sake of brevity.

TABLE 1

Sequences generated for Book A

| Sequence number | Pattern | Pages |
|---|---|---|
| 1 | VOL. IX. 'D' | 59, 155, 171, 187, 203, 219, 235, 251, 267, 283, 299, 315, 331, 363, 427, 459, 475, 491 |
| 2 | VOL. ix. 'D' | 347, 379, 395, 411, 443 |

TABLE 2

Sequences generated for Book B

| Sequence Number | Pattern | Pages |
|---|---|---|
| 1 | 'D' | 96, 109, 156, 157, 173, 189, 237, 253, 269, 285, 317, 333, 349, 365, 397, 413, 445, 461, 477, 509 |
| 2 | 'D' | 175, 178, 182, 188, 193, 203, 209 |
| 3 | 'D' | 333, 344, 354 |

For reading the pattern structures in the above tables (for example, VOL IX. 'D'), the element between quotes represents the incremental part (D) of the text element, the rest represents a fixed part (e.g., VOL. IX.). 'D' represents a sequence of digits (any number in Arabic digits).

Sequence 3 of Book 2 is ignored in the exemplary embodiment of the method because it is too short (less than 4 elements in length).

4: Model Generation (S108)

Figure 5:
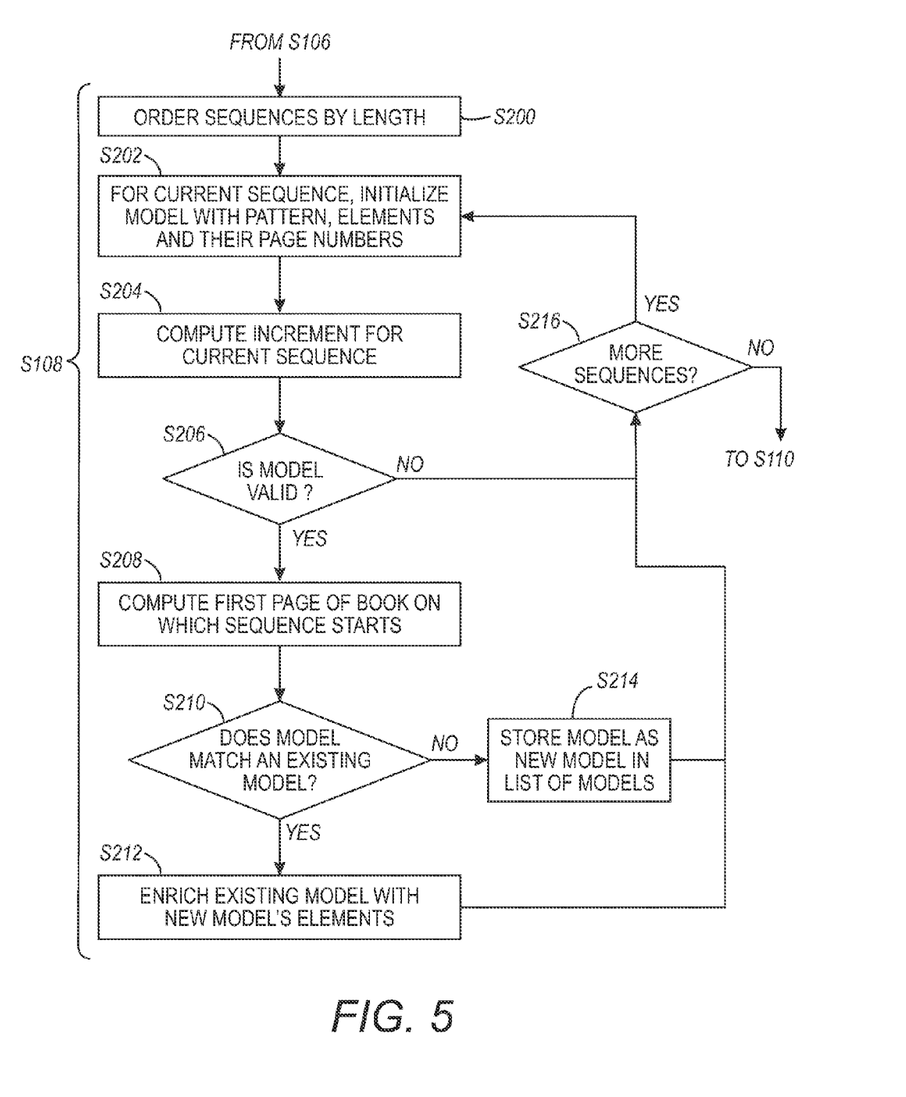
FIG. 5 illustrates generation of a signature mark sequence model in the method of FIG. 4, in accordance with another aspect of the exemplary embodiment.

A sequential covering algorithm may be used to create signature models 50 and to validate candidate sequences. S108 may proceed as shown in FIG. 5.

At S200, candidate sequences 74 are ordered by decreasing length (optional). The length is the number of elements in the detected sequence. Thus, for example, the detected sequence i, ii, iv, vi includes four elements and thus has a length of 4.

At S202, a current model 50 is initialized, for the current sequence, with the elements of the sequence and pages on which they occur.

At S204, an increment value inc is computed for the current sequence.

At S206, the validity of the current model 50 is tested. If at S206, the model is not valid, the method returns to S202, where the next sequence is tested. If, however, at S206, the current model is valid, at S208, a page of the book corresponding to a first element of the sequence is computed. At S210, the model is compared with existing models. If at S210, the model corresponds to an existing model previously stored in a list of models, at S212, the existing model is enriched with the sequence elements of the current model. If at S210, the model does not correspond to an existing model, at S214, the current model is considered a new model, and is stored in the list of models. If at S216, there are more sequences to process, the method returns to S202, where the next sequence becomes the current sequence, otherwise, to S110.

The following sections detail some of the above steps.

4.1: Increment computation (S204)

The increment value inc corresponds to the distance in pages between two consecutive signature marks. To allow for undetected elements in a sequence, a frequency histogram of the distances between pairs of detected, consecutive elements of the sequence is computed over all the pairs of consecutive detected elements (or at least for a plurality of the detected elements of the sequence). The frequency may be expressed as the count for each increment value observed. The most frequent distance is then selected as the increment inc. In some embodiments, a constraint is applied such that the most frequent distance is selected but only if this value is higher than a given threshold (e.g., 50% of the total frequency). If no increment value exceeds the threshold frequency, the signature mark sequence 74 and it model are considered invalid at S206.

In other embodiments, the histogram may be manipulated such that the constraint is less restrictive, for example, if the most frequent distance is not higher than a given threshold, a count for the distance which is twice the most frequent distance is added to its total before applying a constraint.

As will be appreciated, the term histogram encompasses any data structure in which values are stored which allows the most probable increment to be computed and to apply a threshold to delete noisy sequences which do not have sufficient regularity.

If the computed increment value equals 1, the sequence 74 corresponds to the page number sequence and is discarded as an invalid signature mark sequence at S206 and the corresponding model is discarded.

Figure 6:
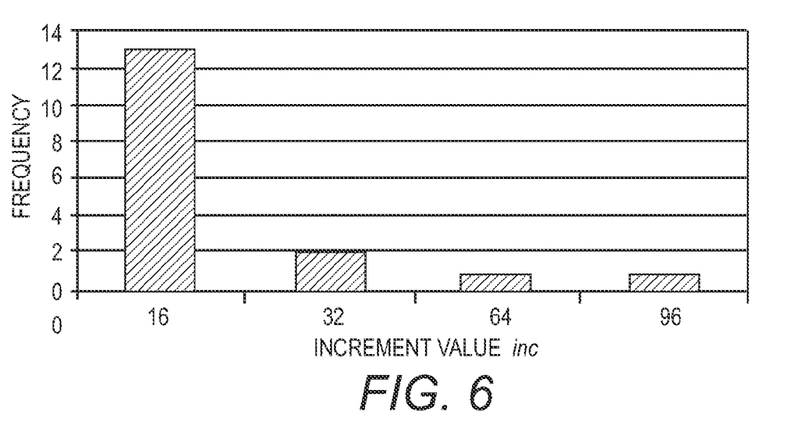
FIG. 6 is a histogram showing number of occurrences vs. increment value for a first detected sequence of Book A.
Figure 7:
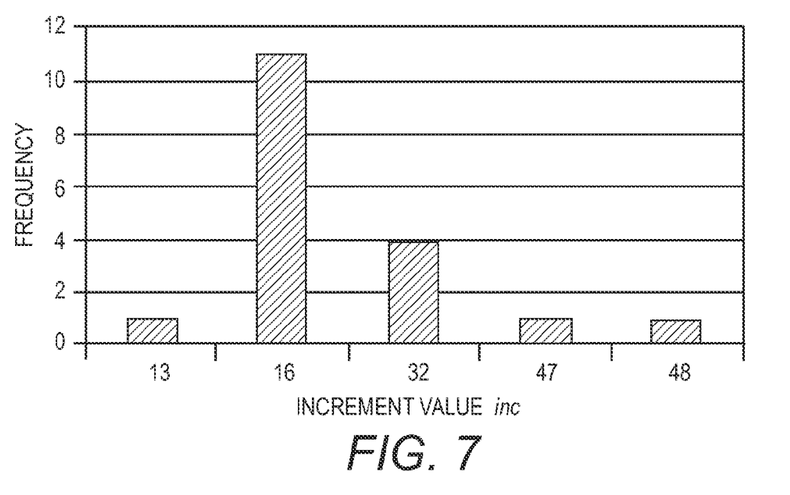
FIG. 7 is a histogram showing number of occurrences vs. increment value for a first detected sequence of Book B.
Figure 8:
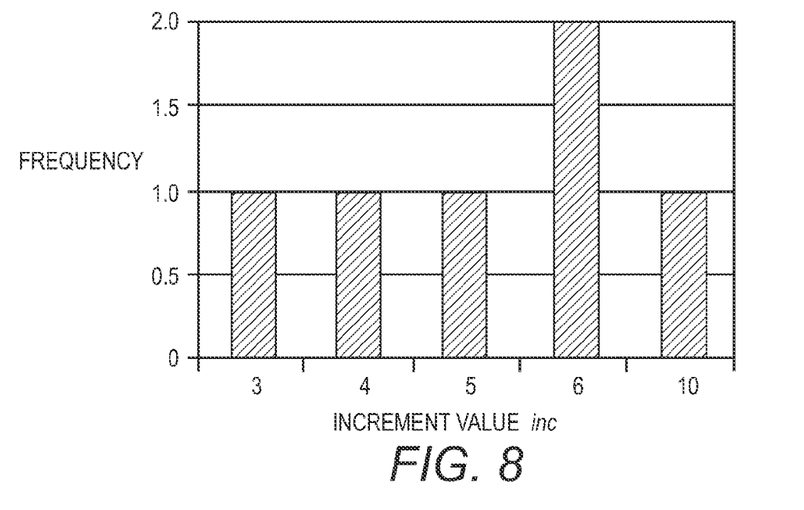
FIG. 8 is a histogram showing number of occurrences vs. increment value for a second detected sequence of Book B.

By way of example, FIG. 6 shows a frequency histogram for Sequence 1, Book A (the pattern [VOL IX. 'D']) and FIG. 7 shows a frequency histogram for Sequence 1, Book B, where the most frequent increments are readily identified as 16. As illustrated in FIG. 8, the increment computation for Sequence 2 of Book B does not show enough regularity to validate any increment value since the most frequent increment (6) has a frequency of 2, which is below the threshold (3 corresponds to 50% of the total frequency). This sequence is therefore discarded.

4.2: Computing The First Page For Each Sequence (S208)

Once the increment value inc for a model 50 is known, the first page on which the first element of the sequence occurs is computed (S208). This computation is desirable since the first elements of the sequence can be noisy and thus not recognized by the OCR. Knowing the increment inc and the value v of the incremental part for a given page q (the qth page of the document), the first page of the sequence can be computed according to the expression:

$$\text{First page value}(fp) = q - (\text{inc} * (v-1))$$

To be robust to noise, this computation is performed for each element of the sequence (or at least for a plurality of the elements of the sequence). The most frequent value of fp is taken as the position of the first page of the sequence. The iteration over all the sequence elements thus accounts for potential noisy elements, for which the value v may be incorrect.

In order to cope with books for which their signature marks do not start with a "one" value (for instance with 'A' or '1' or "i" in Roman numerals), only positive values of fp are accepted (the first page value must be equal to or greater than 1).

For example, if page 50 has a text element e on it which is one of a validated sequence of letters "c, e, f, h", this is given a value 5 as it is the $5^{th}$ letter in the alphabet. If the inc is computed as 16, then:

$$fp = 50 - (16*(5-1)) = -14$$

Since this is negative, it is not accepted, in the exemplary embodiment. The first element of the sequence is incremented by 1 to a value b (or higher, if necessary) and element e is now treated as the 4th element of the sequence and:

$$fp = 50 - (16*(4-1)) = 2$$

which is positive and can therefore be input to the frequency histogram as the value of fp for this element of the sequence.

In the example for Book A, all elements of both the sequences provide 11 as the value fp of the first page.

Figure 9:
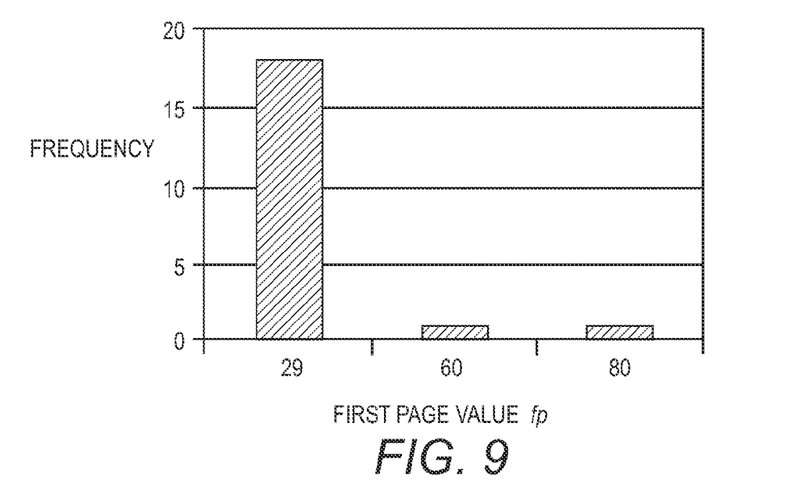
FIG. 9 is a histogram showing number of occurrences vs. first page value for a first detected sequence of Book B.

For Book B, Sequence 1 generates a histogram as shown in FIG. 9. Page 29 is selected as the first page with a frequency of 18. This page corresponds to the first page of the first chapter of the book. It is quite common for there to be no signature mark on the first gathering, as is the case here.

4.3: Comparison with Existing Models (S210)

Once the increment value inc and the first page value fp are computed, these values are stored as the model for the sequence. The model can then be compared with existing models (if any). Two models are considered equivalent if they have the same increment inc and the same first page fp, i.e., ignoring the pattern. If an existing model corresponds to the current model, the elements of the current sequence are added to the previous model (S212) and the two (partial) sequences are combined.

This step enables the merging of different sub-sequences of the same signature sequence that are noisy and for which the sequence detection step (S106) was not able to generate a single sequence (e.g., the number of contiguous missing elements was greater than the threshold, e.g., 5). For example, two sequences "a, b, d, e" and "I, m, n, p" could be merged if their first page and incrementally values are the same, even though there are more than 5 contiguous elements (the letters "f" though "k") missing between "e" and "l".

Secondly, this step enables merging of sequences which were split due to OCR errors in their patterns. In Book A, for example, the Roman numerals of the pattern are recognized as uppercase or lowercase numbers: VOL. IX. 'D' or VOL ix. 'D'. This results in the generation of two sequences (Table 1). In S210, the two sequences are merged into one sequence, since the pattern (or at least, the static part of it) is not considered.

If no previous model is matched, the current model is added to the model list (S214).

5: Model-based Validation of a Signature Mark Sequence (S110)

Figure 10:
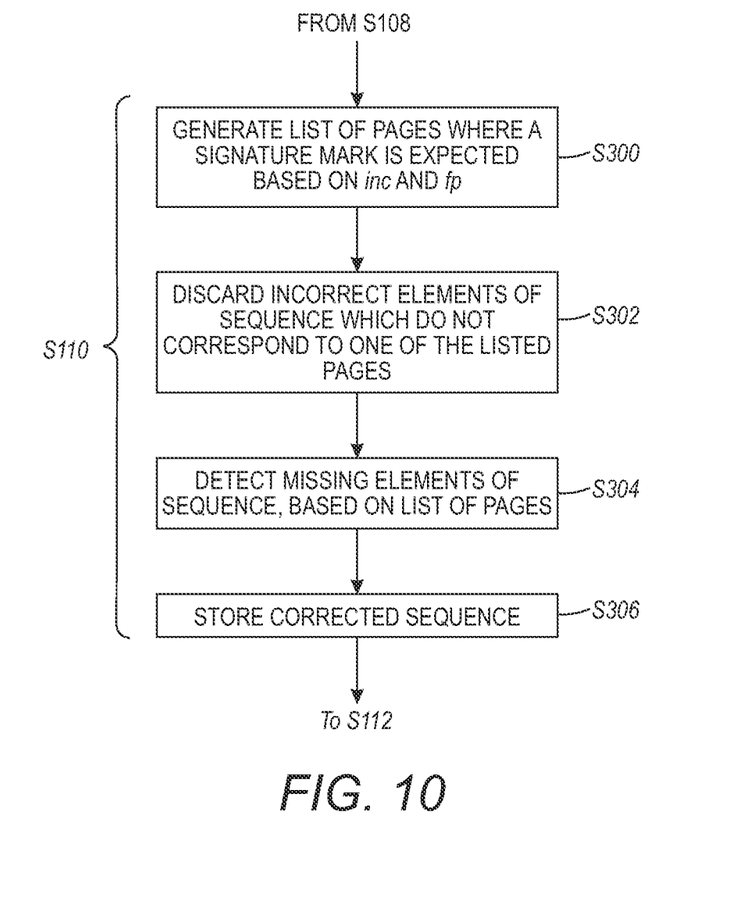
FIG. 10 illustrates a method for validation of a signature mark sequence with the generated model in the method of FIG. 4, in accordance with another aspect of the exemplary embodiment.

For each generated model 50, the different elements found in the sequence are then validated. This includes applying the model to the sequence and text objects to correct the sequence. Example substeps of the model-based correction step (S110) are shown in FIG. 10.

At S300, the list of pages of the model is generated, using the increment value inc and the first page value fp. For example, if fp is 2 and inc is 16, the following list of pages could be generated: 2, 18, 34, 50 . . . up to the maximum number of pages in the book.

At S302, incorrect elements of the sequence, which do not fall on one of these pages, are discarded.

At S304, missing elements of the sequence are detected.

At S306, the validated sequence (list of pages) is stored in memory.

Further details on these steps will now be provided.

5.1: Generation of Page Numbers (S300)

In step S300, the generated list of pages includes each page of the book on which an element of the sequence is expected to occur, based on inc and fp.

For Book A, the generated list of pages is: 11, 27, 43, 59, 75, 91, 107, 123, 139, 155, 171, 187, 203, 219, 235, 251, 267, 283, 299, 315, 331, 347, 363, 379, 395, 411, 427, 443, 459, 475, 491, 507.

For Book B, the generated list of pages is: 29, 45, 61, 77, 93, 109, 125, 141, 157, 173, 189, 205, 221, 237, 253, 269, 285, 301, 317, 333, 349, 365, 381, 397, 413, 429, 445, 461, 477, 493, 509, 525, 541, 557, 573, 589, 605, 621, 637.

The last two pages of Book B do not actually have signature marks (they are part of the back-matter of the book, which often does not have signature marks) and, as previously noted, there is no signature mark on the first gathering.

5.2: Deletion of Incorrect Elements (S302)

At S302, elements of the sequence found at S106, or merged at S210, that do not correspond to the page list of the model 50 generated at S300 are discarded.

For Sequence 1 of Book B, the first element is found on page 96, which does not belong to the list of pages of the model. It actually corresponds to a footnote. Similarly, the third element (p. 156) is also a footnote. No false elements were found for Book A.

5.3: Finding Missing Elements (S304)

At S304, missing elements are identified by comparing the page list of the model 50 and the content of those pages where elements of the sequence are expected to be found, but have not yet been identified. Elements of those pages in the list of pages with the expected pattern are considered as signature marks. This may involve applying a second, more accurate, OCR process to the selected text objects on these pages and/or allowing for small variations to account for OCR errors. In one embodiment, the search for missing elements may go beyond the last n (three) text objects on the page, but may be limited to the text content of a predetermined, specified lower area of the page.

In the case of allowing small variations, an edit-distance can be used for multi-character signature marks. The edit-distance permits a predetermined maximum number, or proportion, of changes between the OCR output and the pattern (e.g., one or more of missing, added, case changed, and/or transposed characters) for the characters to be still considered as obeying the pattern.

Additionally, as noted above, a second OCR process can be used which focuses only on the content in a specified area of those pages in the generated list of pages where a signature mark has not yet been found to try to find missing elements. In one embodiment, the method described in application Ser. No. 12/853,461, filed Aug. 10, 2010, entitled OPTICAL CHARACTER RECOGNITION WITH TWO-PASS ZONING, by Hervé Déjean and Jean-Luc Meunier, can be used to detect elements missed by the first OCR engine. In this method, the location of a missing signature mark in a page can be inferred using the locations of the found elements of a sequence. Then a targeted OCR can be applied only on this zone. This step may be performed prior to comparing the page list of the model 50 and the OCR content of those pages where elements of the sequence are expected to be found.

For Book A, the list of missing elements identified in this process (using a second OCR on the most likely zone of each of the expected pages) is shown in TABLE 3:

TABLE 3

| Page | OCR result |
| --- | --- |
| 11 | VOL IX. |
| 27 | none |
| 43 | TOL. IX. 3 |
| 75 | none |
| 91 | none |
| 107 | none |
| 123 | none |
| 139 | none |
| 507 | none |

The found elements (VOL. IX. And TOL IX. 3) are considered as signature marks when using the edit-distance similarity test.

For this book, the OCR engine was able to detect a two-digit pattern (almost all elements after 10 are recognized), but single digit numbers were often missed.

For Book B, the list of missing elements is shown in TABLE 4:

TABLE 4

| Page | OCR result |
| --- | --- |
| 29 | None |
| 45 | None |
| 61 | 3 |
| 77 | None |
| 93 | None |
| 125 | None |
| 141 | 8 |
| 205 | None |
| 221 | None |
| 301 | None |
| 381 | None |
| 429 | None |
| 493 | None |
| 525 | None |
| 541 | None |
| 557 | 84 |
| 573 | None |
| 589 | None |
| 605 | None |
| 621 | None |
| 637 | None |

The found elements (3, 8, 84) corresponding to the expected pattern (D) are considered as signature marks. The elements on pages 61 and 141 were initially missed due to the wrong elements being selected at S106 (and discarded at Step S302). Element page 557 (84) is wrongly recognized by the OCR and corresponds to the text "34". However, this is a common OCR error and can be considered to match the pattern in the edit distance computation.

Except for three elements (pages 61, 141, 557), the OCR engine was not able to recognize the signature marks. This means that 51% (19/37) of the signature marks were missed by OCR. Nevertheless, the method was able to detect the signature sequence.

6. Labeling (S112)

The found elements are labeled as signature marks. They can be ignored when the content stream of the document is built, avoiding cases where the signature mark interrupts the flow. For example, two paragraphs or part paragraphs of text on consecutive pages are not spaced by a signature mark when the main text of the book is extracted.

The exemplary system and method work well in general. Errors can occur, for example, in cases where the page ordering is wrong or was modified, such as when there are inverted or missed pages during scanning or inserted pages within a gathering corresponding to illustration pages. A second cause of error is when there is a high level of OCR noise, which does not allow for distinguishing two similar sequences. The numerical element of the signature 'X D' (X: uppercase letter, D: Arabic digit) is often missed by the OCR process and only sequences with a partial pattern 'X' are recognized with an irregular increment (the different sequences are merged in one sequence with the pattern 'X'). To improve detection, the second OCR engine could be taught to favor interpretations which are likely signature mark patterns, i.e., be less biased towards interpretations that fit with conventional text.

The method illustrated in FIGS. 4, 5 and 10 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 4, 5 and 10, can be used to implement the method for detecting signature marks.

As will be appreciated, the steps of the method need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for detection of signature marks in a document, comprising:
   selecting candidate text objects for each of an ordered set of optical character recognition (OCR) processed document pages;
   providing for identifying sequences of elements in the candidate text objects, each detected element of an identified sequence occurring on a different page of the document, the sequence having a numbering pattern including an incremental part and optionally a fixed part, missing elements between two detected elements of the sequence being permitted;
   for an identified sequence:
      generating a model of the sequence, the model including:
         the numbering pattern of the sequence,
         an increment, which is computed based on the distance between pages on which consecutive elements of the sequence are identified, a valid sequence having an increment of greater than 1, and
         a first page, which corresponds to a page of the document on which the sequence starts;
      validating the sequence with the model; and
   for a valid sequence, identifying elements of the sequence in the pages of the document as signature marks.

2. The method of claim 1, wherein at least one of the identifying, generating applying, and labeling is performed with a computer processor.

3. The method of claim 1, wherein the incremental part of the pattern comprises at least one of letters, Roman numerals, and Arabic numbers.

4. The method of claim 1, wherein the selecting of the candidate text objects comprises selecting the last n text objects on each page, provided that these text objects are within a predetermined area of the page, and where n is a predetermined number.

5. The method of claim 1, wherein the sequence identification allows for a predetermined number n of missing elements between two detected elements of the sequence.

6. The method of claim 1, wherein in the sequence identification, each sequence comprises at least a minimum number of elements.

7. The method of claim 1, wherein the validating of the sequence with the model comprises generating a list of pages based on the first page value and increment.

8. The method of claim 7, wherein the validating of the sequence with the model comprises applying the model to the document to detect missing elements of the sequence only on the pages in the generated list.

9. The method of claim 7, wherein the validating of the sequence with the model comprises discarding elements of the sequence which are on pages other than the pages in the generated list.

10. The method of claim 1, wherein the validation of the sequence comprises providing for detecting at least one of missing elements and erroneous elements, based on the model.

11. The method of claim 10, wherein the validation of the sequence comprises providing for detecting missing elements, comprising identifying missing elements of the sequence only in the content of pages where a signature mark is expected, based on the model.

12. The method of claim 10, wherein the detection of missing elements of the sequence comprises at least one of:
   applying a second OCR process to a page where a signature mark is expected, based on the model; and
   applying an edit distance to text elements in the content of a page where a signature mark is expected, based on the model, for detecting a text element which is within the edit distance from an expected element of the sequence for the page.

13. The method of claim 1, further comprising discarding the sequence when the computed increment is not greater than 1.

14. The method of claim 1, further comprising comparing a model generated for a first of the sequences with a model for a second of the sequences and combining the first and second sequences when the comparison identifies the models as being equivalent.

15. The method of claim 14, wherein two models are considered equivalent if they have the same first page and the same increment.

16. The method of claim 1, wherein the computing of the increment comprises generating a histogram over observed increment values for the candidate sequence and selecting the most frequent increment value as the increment provided that it meets a threshold frequency.

17. The method of claim 1, further comprising:
for each of a plurality of the elements of the sequence, computing a first page value based on a respective value of the incremental part of the pattern, a page number on which it was identified, and the computed increment, the first page value being positive; and
selecting the most frequent first page value of the computed first page values as the first page for the model of the sequence.

18. A computer program product comprising a non-transitory recording medium, which stores instructions, which when executed by a computer, perform the method of claim 1.

19. A system for performing the method of claim 1 comprising memory which stores instructions for performing the method and a processor in communication with the memory for executing the instructions.

20. A system for detection of signature marks in a document, comprising:
a candidate selector configured for selecting candidate text objects in an ordered set of document pages;
a sequence detector configured for identifying sequences of elements detected in the candidate text objects, each detected element of the sequence occurring on a different page of the document, the sequence having a numbering pattern including an incremental part and optionally a fixed part, the sequence identification allowing for missing elements between two detected elements of the sequence;
a model generator configured for generating models of the sequences identified by the sequence detector, each model storing the numbering pattern of the respective sequence, an increment, which is computed based on the distance between pages on which consecutive elements of the sequence are identified, a valid sequence having an increment of greater than 1, and a first page, which corresponds to the page of the document on which the sequence starts, the model generator combining sequences for which the respective models are equivalent; and
a sequence validator configured for validating the sequences with the model, including at least one of:
deleting elements which do not comply with the model, and
searching for additional elements of the sequence not yet identified by considering only the content of pages which comply with the model.

21. The system of claim 20, further comprising:
a signature labeler configured for labeling identified elements of a validated sequence in the document as signature marks.

22. A method for detection of signature marks in a document, comprising:
receiving an ordered set of document pages into computer memory, the pages having been generated by scanning a multi-page hardcopy document;
providing for identifying sequences of elements in the pages, each sequence having a numbering pattern, each detected element of a respective sequence, apart from the first, having an incremental part which is at least one higher than the incremental part of the previous element of the sequence detected on a previous page of the document, each detected element of the sequence using the same character set, and wherein up to a maximum number of missing elements between two detected elements of the sequence are permitted;
providing for generating a respective model of the sequences identified, each model including:
the numbering pattern of the sequence,
an increment, which is computed based on the distance between the page on which the element is identified and the page on which the next element of the sequence is identified, for a plurality of the elements of the sequence, a valid sequence having an increment of greater than 1, and
a first page, which corresponds to the page of the document on which the sequence starts, the first page being computed using the increment and page numbers for a plurality of the elements of the sequence;
validating the sequence with the model; and
for a valid sequence, identifying elements of the sequence in the pages of the document as signature marks.

* * * * *